(12) United States Patent
Knebel

(10) Patent No.: US 6,788,456 B2
(45) Date of Patent: Sep. 7, 2004

(54) ILLUMINATION DEVICE AND ILLUMINATION METHOD FOR A SCANNING MICROSCOPE

(75) Inventor: Werner Knebel, Kronau (DE)

(73) Assignee: Leica Microsystems Heidelberg GmbH, Mannheim (DE)

(*) Notice: Subject to any disclaimer, the term of this patent is extended or adjusted under 35 U.S.C. 154(b) by 0 days.

(21) Appl. No.: 10/064,653

(22) Filed: Aug. 2, 2002

(65) Prior Publication Data

US 2003/0030901 A1 Feb. 13, 2003

(30) Foreign Application Priority Data

Aug. 13, 2001 (DE) .......................................... 101 39 754

(51) Int. Cl.⁷ .............................................. G02B 21/06

(52) U.S. Cl. ........................................ 359/388; 359/368

(58) Field of Search ................................ 359/368, 372, 359/385, 386, 388, 315, 320

(56) References Cited

U.S. PATENT DOCUMENTS

| | | | | |
|---|---|---|---|---|
| 5,068,541 A | * | 11/1991 | Kondo | ................... 250/559.07 |
| 5,214,489 A | * | 5/1993 | Mizutani et al. | ............. 356/490 |
| 5,462,879 A | * | 10/1995 | Bentsen | ....................... 436/136 |
| 6,154,310 A | | 11/2000 | Galvanauskas et al. | ...... 359/328 |

FOREIGN PATENT DOCUMENTS

| | | | |
|---|---|---|---|
| DE | 199 04 565 A1 | 9/1999 | ............. G02F/1/39 |
| DE | 198 29 981 A1 | 1/2000 | ............ G02B/21/00 |

* cited by examiner

*Primary Examiner*—Mark A. Robinson
(74) *Attorney, Agent, or Firm*—Houston Eliseeva LLP

(57) ABSTRACT

When specimens are illuminated in a scanning microscope, it is often necessary to use radiations of different wavelengths in order to examine the sample. A device and a method for illumination of specimens in a scanning microscope is proposed, a laser being used to generate a laser beam, and an optical system being used to image the laser beam onto the specimen. The optical system comprises a switchable beam deflection device that can direct the laser beam onto the specimen either along a first beam path or along an alternative beam path. In addition, a device for frequency conversion is arranged in the beam path of the alternative beam path.

25 Claims, 5 Drawing Sheets

↕ p-Polarisation

⊗ s-Polarisation

↕ p-Polarisation

⊗ s-Polarisation

ILLUMINATION DEVICE AND ILLUMINATION METHOD FOR A SCANNING MICROSCOPE

CROSS REFERENCE TO RELATED APPLICATIONS

This application claims priority of the German patent application 101 39 754.2 which is incorporated by reference herein.

BACKGROUND OF INVENTION

The invention concerns an illumination device for a scanning microscope. More specifically the invention concerns an illumination device for a scanning microscope for illuminating a specimens in a scanning microscope, which defines a laser beam. The invention furthermore concerns a method for illumination of specimens with such a illumination device. Additionally the invention concerns a scanning microscope.

In scanning microscopy, a specimen is illuminated with a light beam in order to observe the reflected or fluorescent light thereupon emitted by the specimen, laser beams usually being used for illumination. The specimen is scanned by means of a finely focused light beam. In confocal scanning microscopy specifically, the specimen is scanned in three dimensions with the focus of a light beam. A confocal scanning microscope generally comprises a light source, a focusing optical system with which the light of the source is focused onto an aperture stop (called the "excitation stop"), a beam splitter, a beam deflection device for beam control, a microscope optical system, a detection stop, and the detectors for detecting the detected or fluorescent light. The illuminating light is coupled in via a beam splitter. The fluorescent or reflected light coming from the specimen travels through the beam deflection device back to the beam splitter, passes through it, and is then focused onto the detection stop behind which the detectors (usually photomultipliers) are located. Detected light that does not derive directly from the focus region takes a different light beam path and does not pass through the detection stop, so that a point datum is obtained which results, by sequential scanning of the specimen, in a three-dimensional image.

In many of these applications the wavelength of the illuminating light used, i.e. in particular the wavelength of the laser light that is utilized, is of critical importance. For the examination of cell-biology specimens, for example, the latter can be marked with different dyes in various regions. The specimens marked in this fashion can then be examined by means of confocal scanning microscopy, in which context the various dyes are excited to fluoresce. This requires, however, the application of a wavelength with which the particular dye can be excited. Since these wavelengths vary depending on the dye, in the so-called one-photon method it is necessary to perform the examination with the particular appropriate wavelengths.

In order to minimize stress on the samples during examination, the so-called two-photon method is already used. In this, a specimen labeled with dyes is irradiated using lasers that emit ultra-short laser pulses which at the same time have a high peak pulse power. At the focus of this laser radiation, the available photon density is high enough to produce nonlinear optical effects, for example two-photon absorption. Using this effect, it is possible to excite dyes with photons whose energy corresponds to only half the excitation energy inherently required, although two such photons participate in the production of this excitation state and are also necessary for it. The number of suitable lasers at the corresponding wavelengths is limited, however, so that the capabilities for examining the sample are limited to the use of a few dyes that match those wavelengths.

U.S. Pat. No. 6,154,310 has already proposed using a nonlinear optical effect in waveguides which makes it possible to modify the wavelength of a laser that generates ultra-short pulses. This is done by conveying the laser pulse to a plurality of waveguide elements. In each of these waveguide elements, the wavelength of the laser light is modified individually. The divided light beams from the plurality of waveguides are then combined back into a single beam. The result is to generate a new output wavelength that can be used for microscopy. Although the wavelength region can thereby be expanded beyond the usual effective range of a titanium/sapphire (TiSa) laser, the number of attainable wavelengths still remains limited.

Since it is desirable in scanning microscopy, inter alia, to use one-photon and two-photon excitation on a specimen under examination during a microscopy operation, it is nevertheless necessary to utilize different light sources, in particular different laser light sources, having different wavelengths, and to be able to switch between them. It is therefore usual to use for illumination of the specimen a number of radiation sources that are coupled into a microscope through so-called ports between which it is possible to switch. In particular, a mode-coupled TiSa laser can be coupled into the so-called two-photon port, and conventional gas lasers for UV and/or visual excitation can be coupled into the one-photon port. A switchover between the two ports is possible but very complex, since at least two acoustooptical tunable filters (AOTFs), acoustooptical modulators (AOMs), and/or electrooptical modulators (EOMs) are required, as well as a special control board with which the circuit can be activated and synchronized. Even expansion of the wavelength region of a TiSa laser as described above cannot satisfactorily solve this problem, since in this context the laser beam is split using a beam splitter, the first part being used for frequency conversion and the other part directly for illumination of the specimen. Thus only a portion of the energy is available for the two parts of the beam, so that on the one hand the illumination intensity on the sample is less than is desirable, and on the other hand the maximum laser energy is not available for frequency conversion. In addition, utilization of a beam splitter defines a fixed division ratio for the two partial beams. A different fixed division ratio is possible only by replacing the beam splitter. This switchover demands time and possibly alignment. Continuous or rapid changing between different division ratios is not possible.

SUMMARY OF INVENTION

The object of the present invention is accordingly to propose an illumination device for a scanning microscope which easily incorporates two or more illumination conditions.

According to the present invention, this object is achieved by an illumination device for a scanning microscope which comprises:
an illumination source for generating a laser beam;
a switchable beam deflection device which directs, in a first switching state, the laser beam along a first beam path, and in a second switching state, along an alternative beam path; and
a device for frequency conversion of the laser beam is arranged in the beam path of the alternative beam path.

It is a further object of the present invention to propose an illumination device for a scanning microscope which easily incorporates two or more illumination conditions.

According to the present invention, this object is achieved by an illumination device for a scanning microscope which comprises:

an illumination source for generating a laser beam;

a plurality of switchable beam deflection devices, wherein each of which directs, in a first switching state, the laser beam along a first beam path, and in a second switching state, along an alternative beam path and the plurality of switchable beam deflection devices and multiple alternative beam paths are provided in parallel with one another; and a device for frequency conversion of the laser beam is arranged each beam path of the alternative beam path.

It is an object of the present invention to propose a scanning microscope which easily can perform two or more illumination conditions applied to a specimen.

The object is accomplished by a scanning microscope which comprises:

a two photon port and a one-photon port;

an illumination source for generating a laser beam;

at least one switchable beam deflection device which directs, in a first switching state, the laser beam along a first beam path to the two photon port, and in a second switching state, along an alternative beam path to the one-photon port; and a device for frequency conversion of the laser beam is arranged in the beam path of the alternative beam path.

A further object of the present invention is to provide a method for the illumination of a specimen in a scanning microscope, which easily has two or more illumination conditions applied to a specimen.

The above object is accomplished by a method which comprises the steps of:

providing a laser which defines an illumination source for the specimen;

directing the laser beam is directed onto a switchable beam deflection device;

directing the laser beam from the switchable beam deflection device in substantially unattenuated fashion along a first beam path to the two photon port or in substantially unattenuated fashion along an alternative beam path to a one-photon port;

modifying the laser beam, prior to the one-photon port, along the alternative beam path with respect to its frequency; and passing laser beam onto the specimen.

According to the present invention, a device for illumination of the specimens to be examined is provided in a scanning microscope, a laser radiation firstly being generated with a laser. This laser radiation is directed via an optical system onto the specimen to be examined. A switchable deflection device, with which it is possible to convey the incident laser beam either along a first beam path or along an alternative beam path to the microscope and thus to the specimen, is provided in the beam path of the illumination device. The switchable beam deflection device is preferably embodied in such a way that it directs the incident laser radiation substantially entirely along the first or substantially entirely along the alternative beam path. In very particularly preferred fashion, the beam deflection device is embodied in such a way that the division ratio of the incident laser radiation along the first and along the alternative beam path is continuously variable. While the laser radiation along the first beam path remains substantially unchanged at least in terms of its frequency, a component for frequency conversion of the laser beam is provided in the beam path of the alternative beam path. It is thus possible to use the first beam path for a first illumination type and the second beam path for a second illumination type. Illumination of the specimen under different illumination conditions can thus be achieved with a single illumination source (for example, a short-pulse laser). The switchable beam deflection device is preferably embodied in such a way that a rapid switchover between the first and the alternative beam path becomes possible. Optionally, a rapid switchover between different division ratios of the laser radiation along the first and along the alternative beam path is achievable. Usually, laser radiation along the first beam path is coupled into the so-called two-photon port, and laser radiation along the alternative beam path is coupled into the one-photon port, since one-photon excitation and two-photon excitation can be brought about in this fashion.

In a preferred embodiment, a mode-coupled TiSa short-pulse laser is used as the usable output light source. An electrooptical modulator (EOM) connected to a voltage source can be used as the rapidly switchable beam deflection device. The voltage source acts on the EOM in such a way that the polarization direction of the incident light can be rotated. If a polarization beam splitter is then provided in the beam path, the maximum laser power can thus either be used for illumination of the specimen along the first beam path via the two-photon port, or made available at full power for frequency conversion along the alternative beam path. The combination of an EOM (and in particular, associated therewith, the ability to set any desired polarization direction of the laser radiation) and a polarization beam splitter moreover makes possible any desired variation in the laser power along the first and the alternative beam path.

Any component with which it is possible to modify the frequency of an incident illuminating radiation is a possibility as the means for frequency conversion. In particular, the frequency can also be broadened during the frequency conversion, so that polychromatic light, from which the desired frequency band can be picked out by means of a suitable filter, is present at the output of the frequency conversion. With the device according to the present invention it is therefore possible, especially in the context of biological or chemical processes that are to be observed using a scanning microscope, to use two different forms of excitation and to switch rapidly between the two. With line-by-line scanning of the specimen, for example, it is also possible to switch over in line-by-line fashion between the one-photon and the two-photon port. High resolution in time can thereby be achieved, which is very important in particular for biological and chemical processes.

The switchover can, of course, also be accomplished in the context of so-called region-of-interest (ROI) scanning. In this, the specimen is illuminated in general with laser light from the one-photon port, and operation is switched over to the two-photon port in regions of particular interest, so that within the ROIs, scanning takes place with reduced specimen stress using the two-photon port.

BRIEF DESCRIPTION OF DRAWINGS

Further advantages and advantageous embodiments are the subject matter of the description below of the Figures, in which accurately scaled reproduction has been dispensed with in the interest of clarity. Specifically.

DETAILED DESCRIPTION

Figure 1:
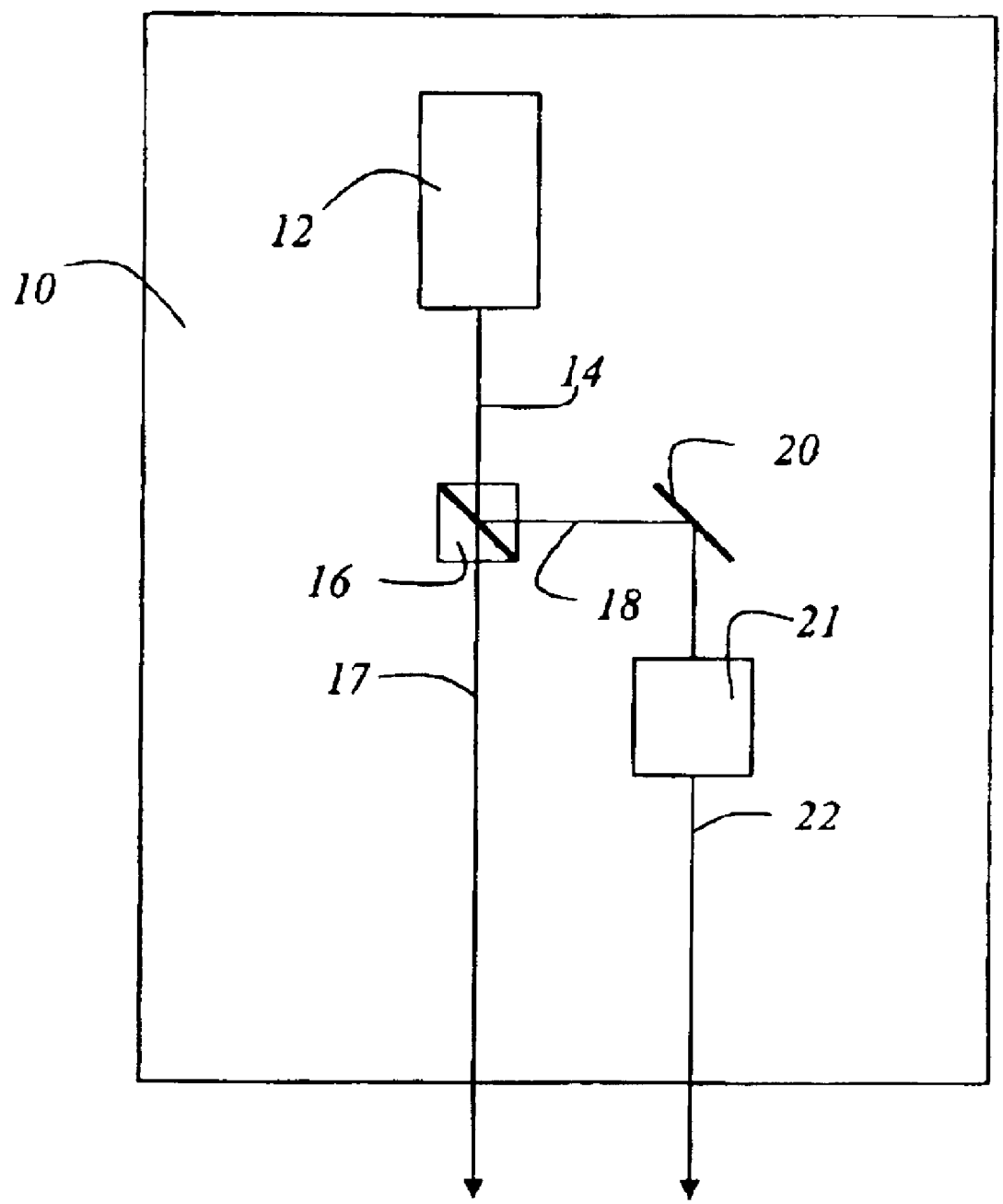
FIG. 1 shows a light source according to the existing art.

FIG. 1 shows an illumination device 10 according to the existing art. A pulsed laser, embodied as a mode-coupled titanium-sapphire (TiSa) laser, is provided as illumination source 12. Light 14 of the pulsed laser is split into a first and a second partial light beam 17 and 18 using the means for spatial division of the light, which is embodied as beam splitter 16. Partial light beam 18 travels via mirror 20 to intermediate element 21, which is embodied as an optically parametric oscillator. Partial light beam 22 emerging from optically parametric oscillator 21 can be coupled directly into a one-photon port of a microscope, while partial beam 17 can be conveyed via a two-photon port to a microscope.

As is clearly evident from FIG. 1, with this method according to the existing art light 14 emerging from illumination source 12 is divided, so that the maximum power of the illumination source is not available either for frequency conversion or for illumination of the specimen.

Figure 2:
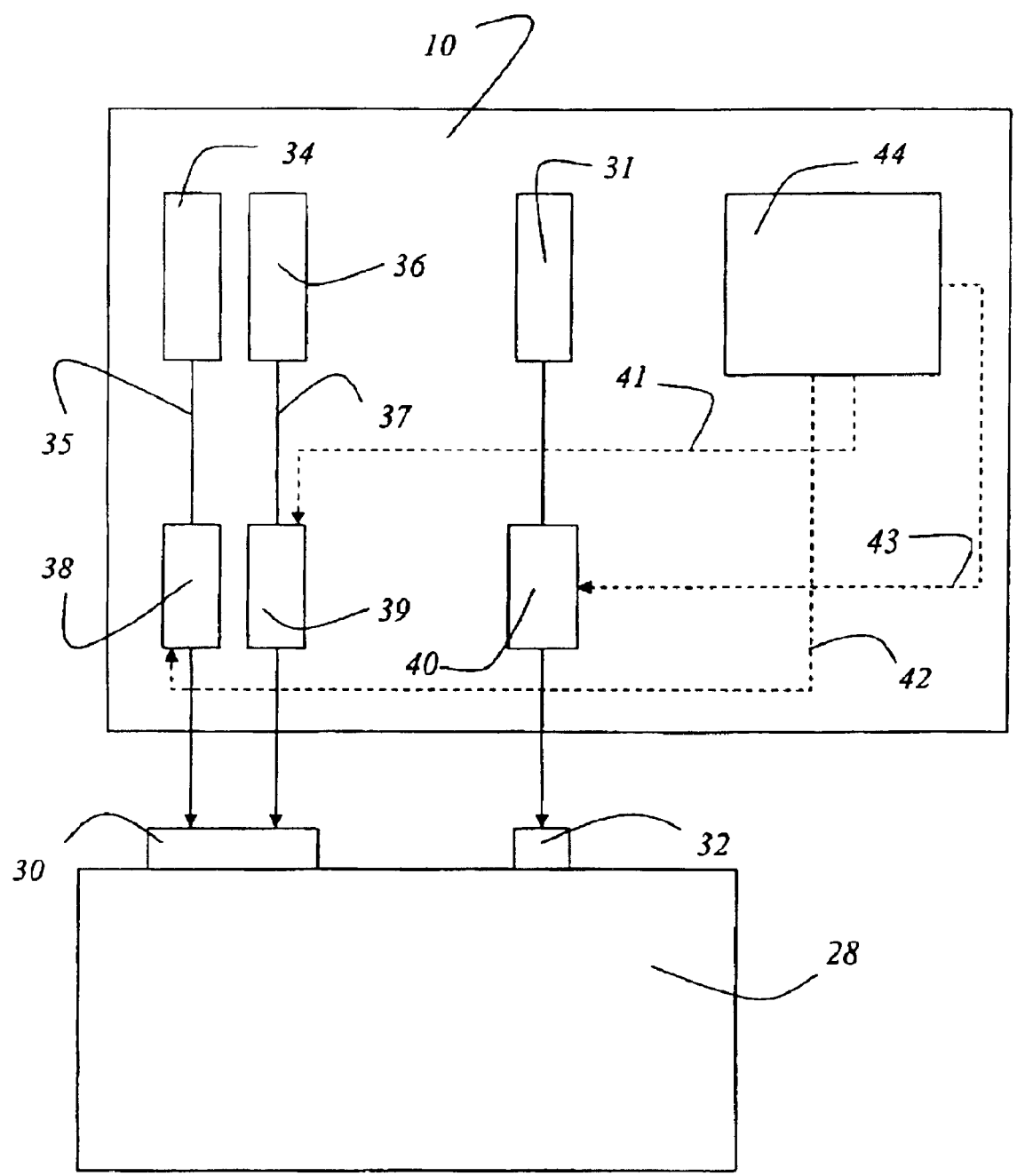
FIG. 2 schematically depicts a scanning microscope system according to the existing art.

FIG. 2 schematically shows a further illumination device 10 according to the existing art. With this, a scanning microscope 28 can be selectably illuminated from a one-photon port 30 or a two-photon port 32. A UV light source 34 and a light source for visible light 36 are provided in order to supply the one-photon port. The power level and wavelength of UV light 35 can be adjusted using a UV acoustooptical tunable filter (AOTF) 38. The wavelength and power level of visible light 37 are selected using an AOTF 39 that is suitable for the visible spectrum. The light source for two-photon port 32 comprises an infrared short-pulse laser 31 whose power level can be varied using an EOM or an acoustooptical modulator (AOM) 40. Switchover between the one-photon and two-photon ports is accomplished by way of a special control board 44 that is connected to AOTFs 38 and 39 via control lines 41 and 42. Control board 44 is connected to the EOM or AOM 40 via control line 43. Control board 44 is designed so that either the one-photon port or the two-photon port is active for microscopy, i.e. it is possible to switch between the two ports using control board 44. As is evident from FIG. 2, several light sources 31, 3, 36 are necessary with this illumination device according to the existing art. In addition, a very complex control device 44, 38, 39, 40 is necessary to allow switching between the two ports.

Figure 3:
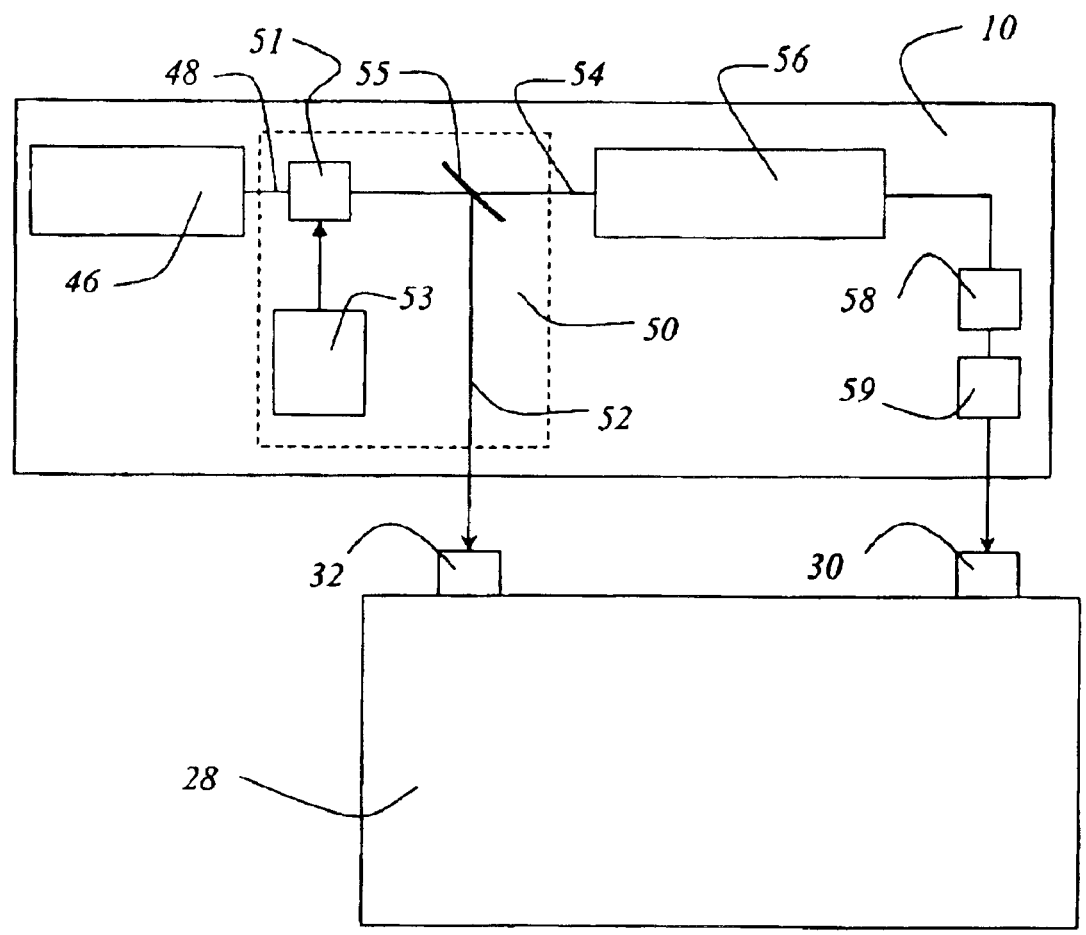
FIG. 3 schematically depicts a scanning microscope according to the present invention.

FIG. 3 shows, in a general depiction, a device 10 for illumination of specimens 11 according to the present invention, Here again, it is possible to illuminate a scanning microscope 28 via a two-photon port 32 or a one-photon port 30. An IR short-pulse laser 46 that generates a laser beam 48 is provided for this purpose in illumination device 10. This laser beam is conveyed to a switchable beam deflection device 50. Switchable beam deflection device 50 preferably comprises an EOM 51 that is connected to a high-voltage source 53. A polarization beam splitter 55 is also preferably provided in switchable beam deflection device 50. Elements 51, 53, 55 that are provided in switchable beam deflection device 50 are embodied in such a way that depending upon activation, they can direct the incident laser beam with substantially unchanged intensity along first beam path 52 or with substantially unchanged intensity along alternative beam path 54. A component for frequency conversion 56 is additionally provided along alternative beam path 54. Component for frequency conversion 56 is embodied in such a way that the frequency of incident laser beam 48 can be converted in order to make available to one-photon port 30 a radiation with which it is possible to operate scanning microscope 28 in such a way that one-photon excitation of the illuminated specimen can be performed. It may be additionally necessary in this context to provide a component for wavelength selection 58 and/or a component for intensity variation 59, with which the light beam parameters at one-photon port 30 can be controlled.

Figure 4A:
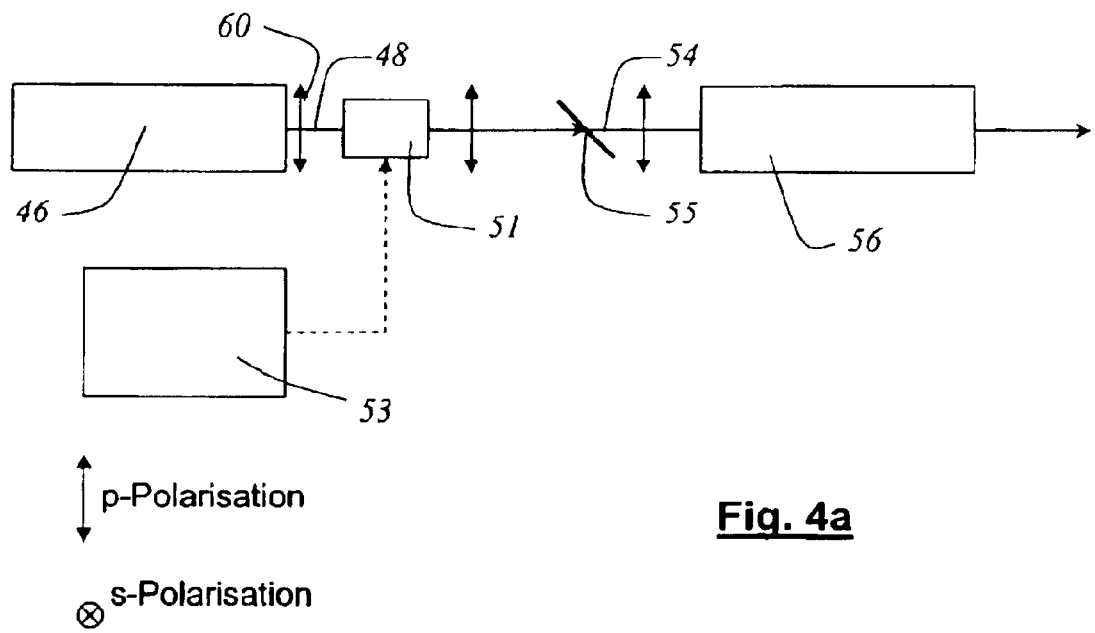
FIG. 4a shows a first working mode of the system of FIG. 3.

FIG. 4a depicts the manner of operation of switchable beam deflection device 50 with reference to switchover into alternative beam path 54. Laser beam 48 coming from IR short-pulse laser 46 travels through EOM 51. EOM 51 is connected to high-voltage source 53. If no voltage is being generated by high-voltage source 53 at EOM 51, laser beam 48 passes through EOM 51 unchanged, i.e. the polarization direction of the laser light is the same before and after passing through EOM 51. In this case, polarization beam splitter 55 is designed so that the incoming P-polarized light 60 is allowed to pass almost completely and is conveyed to component for frequency conversion 56. Frequency conversion can be accomplished using any known means. For this purpose, in particular, a means for frequency multiplication or an OPO can be used, or white light can be generated in an optically microstructured material. Also particularly suitable in this context is the capability, already described in U.S. Pat. No. 6,097,870, for generating a broad-band spectrum in the visible and infrared spectral region. With this method, the frequency conversion is effected by the fact that the incident light radiation is introduced into a special waveguide that comprises a special core and a cladding. In this waveguide, the properties of the core and the difference in refraction between the core and the sheathing are coordinated with one another in order to produce the desired effect. The frequency conversion can also, however, be performed with the method described in U.S. Pat. No. 6,154,310, in which the incident laser light is introduced into a plurality of optical fibers, frequency-converted in said fibers, and then combined again. Also previously known are methods with which the conversion of ultra-short pulses of a TiSa laser into white light can be accomplished, so that after frequency conversion a polychromatic light with a spectrum of approximately 350 to 1600 nm, which is usable for a number of different processes, can be generated. Using this converted light it is possible, for example, to utilize processes such as cage compound release or physiological labeling, for example pH, calcium membrane potential indication, or nucleus staining. The selection of the desired frequency band that is usually necessary for the purpose can be performed via a downstream filter (not shown).

Figure 4B:
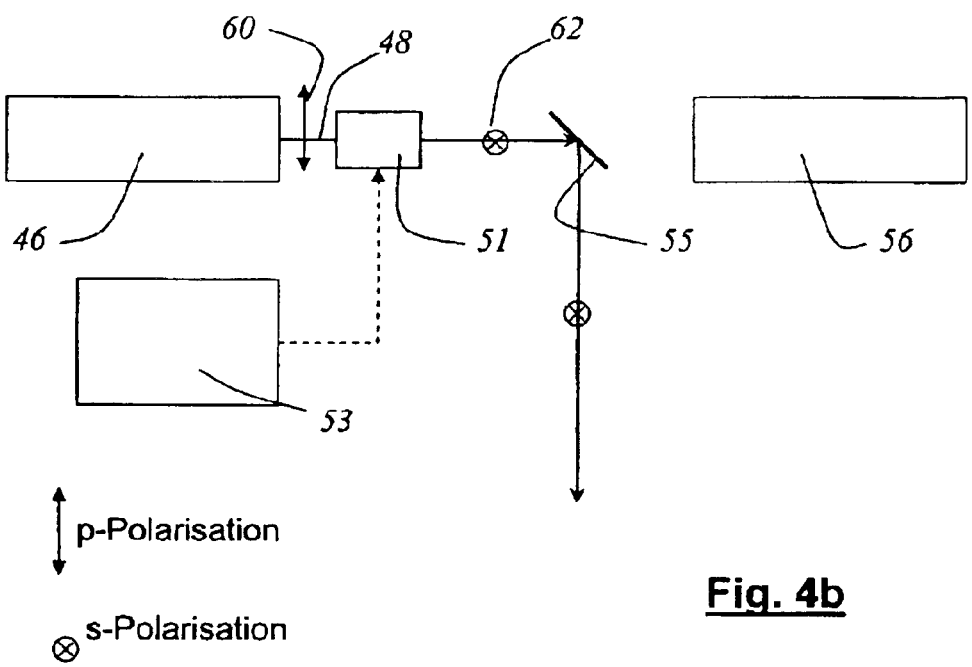
FIG. 4b shows a second working mode of the system of FIG. 3.

FIG. 4b shows the situation upon deflection of the laser beam into the two-photon port. Laser light 48 proceeding from IR short-pulse laser 46 has, for example, a P polarization 60. High-voltage source 53 now has applied to it a voltage which is suitable for controlling EOM 51 in such a way that the incident P-polarized radiation is rotated 90° in its polarization direction 55. The laser radiation, now present with S polarization 62, is then diverted at the polarization beam splitter substantially entirely in the direction of first beam path 52, i.e. toward two-photon port 32. The laser light thus does not undergo frequency conversion, and is available in its entirety for examination of the specimen via the two-photon port.

The present invention creates, with only a single EOM in combination with a single polarization beam splitter, a capability for making available to a microscope the radiation necessary for a one-photon and a two-photon port. If no voltage is present at the EOM, an e.g. linearly polarized (for example, p-polarized) laser beam passes through EOM 51 with the same polarization and is almost entirely transmitted at the polarization beam splitter and conveyed to frequency conversion. If a so-called λ/2 voltage is present at EOM 51, the polarization direction of the light beam is rotated exactly 90°. The incoming light experiences almost complete reflection at polarization beam splitter 55 and is then therefore available at the two-photon port of the microscope. Since switchover of the EOM can occur at a frequency of approx. 100 kHz, an extraordinarily fast capability thus exists for switching between different illumination types in a microscope. This can be used, for example, to permit line-by-line switchover between the one-photon and two-photon port while scanning a specimen.

As already described, it is also conceivable to activate EOM 51 with any desired voltages between 0 V and the λ/2 voltage, and switch rapidly back and forth between different voltage values. A variable switch for simultaneous division of the laser light can be generated in this case.

Figure 5:
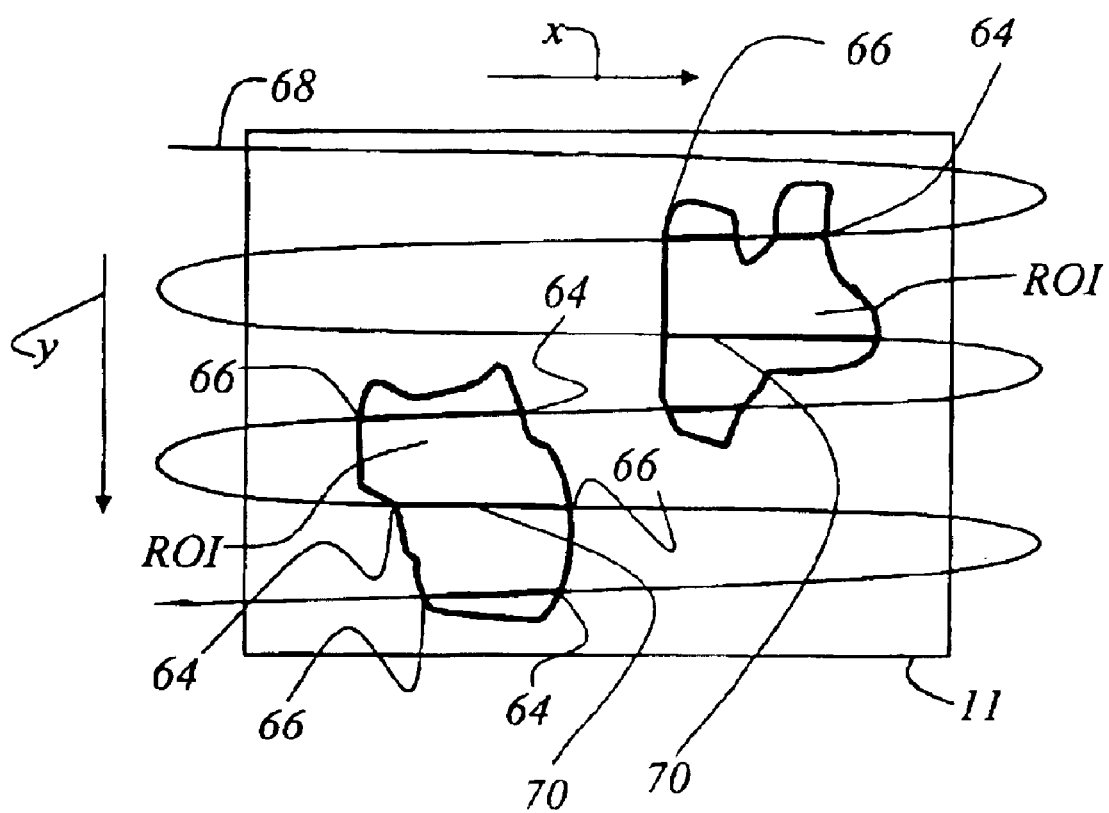
FIG. 5 shows an example of illumination of a microscopic preparation using the system of FIG. 3.

As FIG. 5 shows, however, it is also possible with this microscope to perform an extraordinarily fast so-called region-of-interest (ROI) scan. With this type of specimen examination, the light beam coming out of one-photon port 68 is guided over the specimen until a particular region of interest (ROI) of the specimen is reached. As soon as the beam reaches switchover point 64, the switchover is initiated and operation switches over to two-photon port 32, as described above. Scanning of the ROI is then accomplished using light beam 70 from the two-photon port, until switchover point 66 where operation switches back to one-photon port 30. In this way it is possible not only to illuminate specimen 11 by switching over in line-by-line fashion between the one-photon and two-photon port, but also to make specific changes in the illumination type when regions of particular interest are being scanned. Since the switchover between illumination types can be performed particularly quickly, this is possible even for very small ROIs.

The invention has been described with reference to a particular exemplary embodiment. It is nevertheless self-evident that changes and modifications can be made without thereby leaving the scope of protection of the claims below.

What is claimed is:

1. An illumination device for a scanning microscope comprises:
   an illumination source for generating a laser beam;
   a switchable beam deflection device which directs, in a first switching state, the laser beam along a frequency preserving beam path, and in a second switching state, along an alternative beam path; and
   a device for frequency conversion of the laser beam is arranged in the beam path of the alternative beam path.

2. The device as defined in claim 1, wherein the switchable beam deflection device comprises a polarization beam splitter in combination with an electrooptical modulator (EOM).

3. The device as defined in claim 1, wherein the device for frequency conversion of the laser beam comprises a waveguide, in particular a waveguide having multiple waveguide tracks.

4. The device as defined in claim 1, wherein the device for frequency conversion of the laser beam is suitable for generating white light.

5. The device as defined in claim 4, wherein the device for frequency conversion of the laser beam comprises a filter device for selecting out a wavelength band.

6. The device as defined in claim 1, wherein the device for frequency conversion of the laser beam comprises a second laser, an optically microstructured material, an OPO, or a device for frequency multiplication.

7. The device as defined in claim 1, wherein the switchable beam deflection device is suitable for directing the laser beam either substantially entirely along the frequency preserving beam path or substantially entirely along the alternative beam path.

8. An illumination device for a scanning microscope comprises:
   an illumination source for generating a laser beam;
   a plurality of switchable beam deflection devices, wherein each of which directs, in a first switching state, the laser beam along a frequency preserving beam path, and in a second switching state, along an alternative beam path and the plurality of switchable beam deflection devices and multiple alternative beam paths are provided in parallel with one another; and
   a device for frequency conversion of the laser beam arranged on each beam path of the alternative beam path.

9. The device as defined in claim 8, wherein each switchable beam deflection device is suitable for directing the laser beam either substantially entirely along the frequency preserving beam path or substantially entirely along the alternative beam path.

10. The device as defined in claim 9, wherein each switchable beam deflection device comprises a polarization beam splitter in combination with an electrooptical modulator (EOM).

11. The device as defined in claim 8, wherein the device for frequency conversion of the laser beam comprises a waveguide, in particular a waveguide having multiple waveguide tracks.

12. The device as defined in claim 8, wherein the device for frequency conversion of the laser beam is suitable for generating white light.

13. The device as defined in claim 12, wherein the device for frequency conversion of the laser beam comprises a filter device for selecting out a wavelength band.

14. A scanning microscope comprises:
   a two photon port and a one-photon port;
   an illumination source for generating a laser beam;
   at least one switchable beam deflection device which directs, in a first switching state, the laser beam along a first beam path to the two photon port, and in a second switching state, along an alternative beam path (54) to the one-photon port; and
   a device for frequency conversion of the laser beam is arranged in the beam path of the alternative beam path.

15. The scanning microscope as defined in claim 14, wherein the switchable beam deflection device comprises a polanzation beam splitter in combination with an electrooptical modulator (EOM).

16. The scanning microscope as defined in claim 14, wherein the device for frequency conversion of the laser beam comprises a waveguide, in particular a waveguide having multiple waveguide tracks.

17. The scanning microscope as defined in claim 14, wherein the device for frequency conversion of the laser beam is suitable for generating white light.

18. The scanning microscope as defined in claim 17, wherein the device for frequency conversion of the laser beam comprises a filter device for selecting out a wavelength band.

19. The scanning microscope as defined in claim 14, wherein the device for frequency conversion of the laser beam comprises a second laser, an optically microstructured material, an OPO, or a device for frequency multiplication.

20. A method for illumination of a specimen in a scanning microscope wherein the scanning microscope has a two photon port and a one-photon port, comprising the steps:

providing a laser which defines an illumination source for the specimen;

directing the laser beam is directed onto a switchable beam deflection device;

directing the laser beam from the switchable beam deflection device in substantially unattenuated fashion along a first beam path to the two photon port or in substantially unattenuated fashion along an alternative beam path to a one-photon port;

modifying the laser beam, prior to the one-photon port, along the alternative beam path with respect to its frequency; and passing laser beam onto the specimen.

21. The method as defined in claim 20, wherein the switchable beam deflection device is activated so that in the context of line-by-line illumination of the specimen, a line-by-line switchover between the first beam path and the alternative beam path is accomplished.

22. The method as defined in claim 20, wherein an optical fiber is used for modifying the frequency of the laser light in the alternative beam path.

23. The method as defined in claim 22, wherein the laser light on the alternative beam path is directed into a plurality of optical fibers.

24. The method as defined in claim 20, wherein the frequency modification is performed in such a way that white light results.

25. The method as defined in claim 20, wherein the specimen comprises regions of interest (ROIs), and the switchable beam deflection device is controlled in such a way that illumination is accomplished within the ROIs with the light beam from the two-photo port and outside the ROIs with the light beam from the one-photon port.

* * * * *